United States Patent [19]

Langer et al.

[11] Patent Number: 4,923,264

[45] Date of Patent: May 8, 1990

[54] RESONANCE COUPLED OPTICAL COUPLER WITH SEMICONDUCTOR WAVEGUIDE LAYER COMPRISING A MULTI-QUANTUM-WELL STRUCTURE

[75] Inventors: Dietrich W. Langer, Pittsburgh, Pa.; Marek Chmielowski, Bethesda, Md.

[73] Assignee: University of Pittsburgh of the Commonwealth System of Higher Education, Pittsburgh, Pa.

[21] Appl. No.: 298,572

[22] Filed: Jan. 18, 1989

[51] Int. Cl.$^5$ .................. G02B 6/10; H01L 33/00
[52] U.S. Cl. .................. 350/96.14; 350/355; 357/17
[58] Field of Search ............ 350/96.12, 96.13, 96.14, 350/96.15, 355, 356; 357/16, 17, 30

[56] References Cited

U.S. PATENT DOCUMENTS

| | | | |
|---|---|---|---|
| 3,976,358 | 8/1976 | Thompson | 350/96.14 |
| 4,048,591 | 9/1977 | Auracher | 350/160 R |
| 4,675,518 | 6/1987 | Oimura et al. | 250/205 |
| 4,688,068 | 8/1987 | Chaffin et al. | 357/30 |
| 4,714,311 | 12/1987 | Auracher | 350/96.11 |
| 4,737,003 | 4/1988 | Matsumura et al. | 350/96.14 |
| 4,840,446 | 6/1989 | Nakamura et al. | 350/96.13 |

FOREIGN PATENT DOCUMENTS

| | | | |
|---|---|---|---|
| 62-75417 | 4/1987 | Japan . | |
| 0100422 | 5/1988 | Japan | 350/96.14 |
| 217212A | 10/1986 | United Kingdom . | |

OTHER PUBLICATIONS

Kunio Tada and Keikichi Hirose, A New Light Modulator Using Perturbation of Synchronism Between Two Coupled Guides, Appl. Phys. Lett., vol. 25, No. 10, Nov. 15, 1974.

F. K. Reinhart and R. A. Logan, Monolithically Integrated AlGaAs Double Heterostructure Optical Components, Appl. Phys. Lett., vol. 25, No. 10, Nov. 15, 1974.

Alsushi Shibukawa and Mori Kobayashi, Optical Te-Tm Mode Conversion in Double Epitaxial Garnet Waveguide, Applied Optics, vol. 20, No. 14, pp. 2444–2450, Jul. 15, 1981.

Primary Examiner—John D. Lee
Assistant Examiner—Akm E. Ullah
Attorney, Agent, or Firm—Richard V. Westerhoff

[57] ABSTRACT

An electro-optic coupler made of consecutively deposited layers of semiconductor material has an one waveguide layer a multiple-quantum-well structure which exhibits a strong index of refraction dispersion in response to an electric field. Another waveguide layer separated from the multiple-quantum-well structure by a coupling layer is made of a bulk semiconductor material having an index of refraction which is comparatively unaffected by the electric field and which is substantially equal to one of the values of the index of refraction that the quantum well structure can assume. Resonant coupling of the waveguide layers is affected by a uniform electric field generated by a voltage applied between metalization on a confinement layer covering the top waveguide and a substrate on which the waveguide layers and coupling layer are grown over a lower confinement layer. When the indices of refraction of the two waveguides are equal, light injected into one waveguide is switched to the other. On the other hand, when the indices of refraction of the two waveguides are not equal, a parallel propagation condition exists. The coupler can be used either as a switch or an attenuator.

20 Claims, 5 Drawing Sheets

RESONANCE COUPLED OPTICAL COUPLER WITH SEMICONDUCTOR WAVEGUIDE LAYER COMPRISING A MULTI-QUANTUM-WELL STRUCTURE

BACKGROUND OF INVENTION

1. Field of the Invention

This invention relates to semiconductor devices selectively coupling light from one waveguide to another for such applications as switching light between waveguides and attenuating or modulating light in a waveguide. More particularly, the present invention is directed to an optical switch in which light is resonant coupled between stacked, semiconductor waveguide layers grown on a substrate, separated by a coupling layer and bounded by containment layers with one waveguide layer being composed of a superlattice of multiple-quantum-well (MQW) material having an index of refraction which varies substantially with an applied electric field and the other waveguide layer composed of a material having an index of refraction which varies relatively little with the electric field. The electric field varies the index of refraction of the MQW waveguide layer between a value compatible with the index of refraction of the other waveguide to resonantly couple light between the waveguides, and a substantially different index of refraction in which no substantial amount of light is coupled between the waveguides.

2. Background Information

Semiconductor devices for switching light between waveguides are known. In one type of such devices the waveguides are formed side by side in a common plane with a suitable coupling material between. Typically, the index of refraction in the two waveguides is identical and that of the coupling material is lower so that there is resonant coupling between the waveguides in a cross propagation or "switch" condition. A "no switch" or parallel propagation condition is commonly created by an induced phase change in one of the guides, normally caused by an electric field induced change of the index of refraction (dn/dE) in one waveguide. The value of dn/dE is a factor which determines the magnitude of the electric field required to switch the light. The larger dn/dE, the smaller the voltage required for a given geometric configuration.

Other factors affecting the operation of such devices are the index of refraction and width of the coupling material. Within limits, the smaller the difference between the indices of refraction of the waveguides and the coupling material, and the narrower the width of the coupling material, the shorter is the length of the parallel waveguides required for cross coupling. In turn, a shorter device length results in decreased device capacitance, and thus an increase in the maximum switching speed and a decrease of the energy required per switching cycle.

Thus, material and fabrication constraints have set the performance and dimensional limits of such devices. Conventionally, the material used has been $LiNbO_3$ or GaAs. Fabrication techniques, namely lithography and the need for well defined etching, usually set a lower limit of 3 micrometers for the width of the coupling material. This results in a required length of about 5 mm. Because of the relatively small dn/dE value for GaAs ($7.10^{-10}$ cm/V), the required voltage for switching from cross-to-parallel propagation is on the order of 20 volts and the required energy is estimated to be about 240 pj. All of these values are too large for high level integration of the devices for complex applications.

It has been suggested in U.S. Pat. No. 4,048,591 that discrete waveguide elements can be stacked one on top of the other with a film of dielectric material in between, however, this patent concludes that it is preferable to place the two discrete waveguides side by side with a third coupling waveguide and the film of dielectric material overlapping both of them.

It has also been suggested in published United Kingdom patent application No. GB 2174212A that optical switching devices can be constructed from layers of semiconductor materials grown on the substrate. The waveguide layers are made of the same material and thus have identical indices of refraction. They are separated by a coupling layer having an index of refraction which varies substantially to effect switching between parallel and cross propagation. In these devices, the index of refraction of the coupling layer is controlled by current rather than voltage. The coupling layer is doped to provide the free carriers required to support the current. Such current operated devices require significantly more power than voltage operated devices.

Most of the optical switches utilize homogeneous materials such as $LiNbO_3$, GaAs or ternary GaAlAs. U.S. Pat. No. 4,737,003 suggests the use of thin layers of multiple-quantum-well material as a selectively reflective layer at the intersection of two waveguides in a common plane. The index of refraction of the multiple-quantum-well reflective layer is varied through the injection of carriers to either reflect light into the intersecting waveguide or to let it pass straight through. This is a very complex device to construct, and again, using carrier injection to control the refraction index, it has a high power consumption.

Multiple-quantum-well structures comprise alternating very thin layers of materials having different conduction band energy levels to create quantum-wells between barrier layers. Such materials are known to exhibit an unusually strong dispersion of the index of refraction near excitonic transitions which are coupled to the electron-hole energies of the the well. However, the principal interest in these devices has been in the electro-absorptive effect or the change in absorption as a function of an electric field. Such devices have been investigated for use in external modulators for lasers used in transmitting data at high rates. The light generated by the laser is injected into the multiple-quantum-well material which is selected such that the light is absorbed in the "OFF" state and passed through in the "ON" state. One disadvantage of such a device is that there is still a great deal of absorption in the "ON" state so that the efficiency of the device is not favorable. In addition, the switching time of such devices is limited by the life time of the excited carriers.

There remains a need therefore for an optical coupler small in size suitable for large scale integration.

There is a concurrent need for such an optical coupler which operates at low voltages and with low energy consumption.

There is also a need for such an optical coupler having a very fast switching time.

There is a further need for such an optical coupler with improved separation between the on and off states.

There is yet another need for such an optical coupler with the above characteristics which can be used either as a light switch or an attenuator.

There is an additional need for such an attenuator exhibiting a reduction in residual absorption in the "ON" state.

SUMMARY OF THE INVENTION

These and other needs are satisfied by the invention which is directed to an optical coupler comprising a plurality of layers of semiconductor materials. These layers of semiconductor materials include a first waveguide layer having an index of refraction $n_1$, a second waveguide layer made of an electro-optically active multiple-quantum-well structure having an index of refraction $n_2$, and a coupling layer between the waveguide layers having an index of refraction N. Confinement layers adjacent the waveguide layers have indices of refraction $n_3$. The coupler includes means for applying an electric field across the plurality of layers of semiconductor material, which in the preferred form comprises a metallic contact layer coextensive with the waveguide layers, and a substrate on which the layers of semiconductor materials are grown. The indices of refraction $n_1$, N, and $n_3$ of the first waveguide, the coupling layer and the confinement layers respectively are relatively unaffected by the electric field when compared to the index of refraction $n_2$ of the multiple-quantum-well structure which varies substantially with the electric field between a first value in the absence of the electric field and a second value in the presence of the field. One of these values of $n_2$ is selected to be substantially equal to the index of refraction $n_1$ of the first waveguide. The index of refraction of the coupling layer, N, is selected to be less than $n_1$ and both values of $n_2$, while $n_3$, the index of refraction of the confinement layers, is the lowest of all. When $n_1$ and $n_2$ are not equal, a parallel propagation condition exists in which light injected into one waveguide essentially remains in that waveguide. When $n_1$ equals $n_2$, a cross-propagation condition is established and light injected into the one waveguide is switched to the other waveguide. The layers of the coupler extend a distance, L, in the direction of propagation of light injected into one of the waveguides, selected to effect maximum coupling between the waveguides when $n_2$ equals $n_1$. This optimum length for the device changes with variations in the absorption coefficients of the waveguide materials.

In the preferred form of the invention, the semiconductor materials are selected such that the index of refraction $n_2$ of the multiple-quantum-well structure of the second waveguide is equal to the index of refraction $n_1$ of the first waveguide in the presence of the electric field.

The electro-optic coupler of the invention is useful as a light switch and as an attenuator. When used as an attenuator, or light modulator, light is injected into the first waveguide. The light remains in the first waveguide in the "ON" state in which $n_1$ and $n_2$ are not equal. In the "OFF" state, $n_1$, equals $n_2$, and light is switched to the multiple-quantum-well structure where it is dissipated. For this application, the materials are selected such that the device operates for the selected light wavelength closer to the excitonic transition energy where the absorption coefficient is higher to effect better dissipation of the switched light.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The electro-optic coupler of the invention makes use of the unusually strong dispersion of the index of refraction of quantum-well material structures near and below the excitonic transition energy, and a vertical structure rather than the planar structure typically used to date in such devices.

Figure 1:
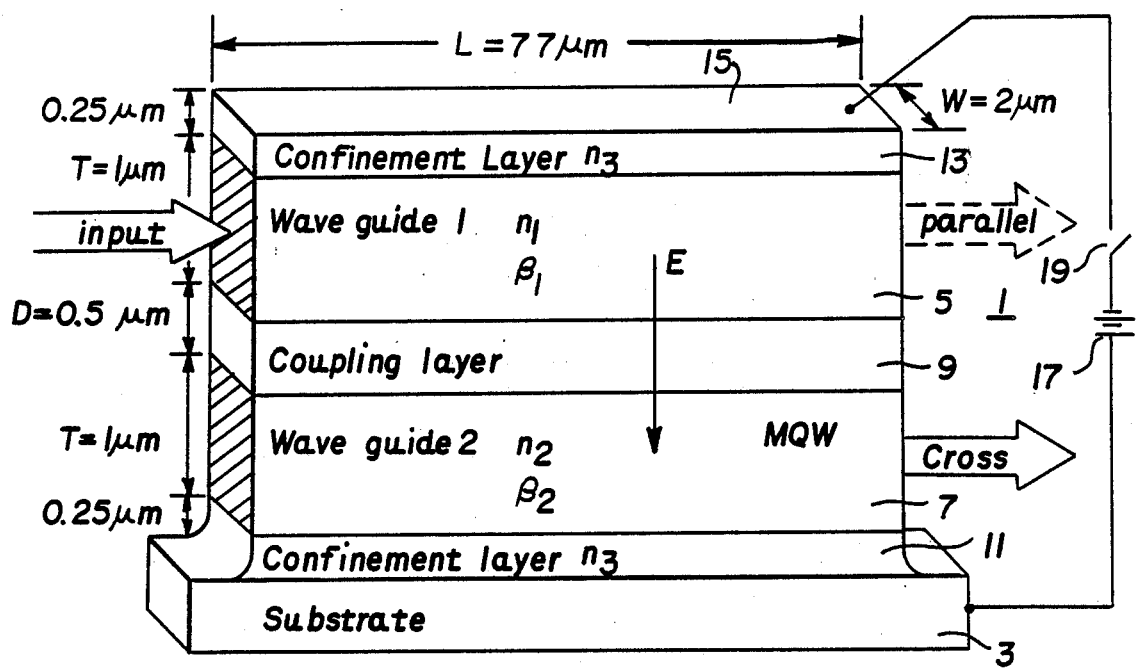
FIG. 1 is an isometric representation of an electro-optical coupler in accordance with the invention.

Referring to FIG. 1, the coupler 1 comprises a plurality of layers of semiconductor material grown on a substrate 3. These layers include a first waveguide layer 5, a second waveguide layer 7, a coupling layer 9 between the first and second waveguide layers, a first confinement layer 11 between the substrate and the second waveguide layer 7, and a second confinement layer 13 over the first waveguide layer 5. A metalization contact layer 15 is coextensive with the second confinement layer 13. An electric field is applied to the device by a voltage source 17 connected to the contact layer 15 and the substrate 3, and controlled by a switch 19.

The first waveguide 5 is made of a bulk semiconductor material having an index of refraction $n_1$. The second waveguide 7 is a multiple-quantum-well structure having an index of refraction $n_2$. The coupling layer 9 has an index of refraction N, while the confinement layers 11 and 13 have an index of refraction $n_3$. The index of refraction $n_3$ of the confinement layers 11 and 13 is much lower that the indices of refraction $n_2$ and $n_1$ to confine light to the waveguides 7 and 5 respectively. The index of refraction $n_2$ is variable between a first value in the absence of the electric field E and a second value in the presence of the field. One of these values of $n_2$ is substantially equal to $n_1$, the index of refraction of the first waveguide 5 which is comparatively unaffected by the field E. The index of refraction N of the coupling layer is less than $n_1$ and both values of $n_2$, but greater than $n_3$, and together with $n_3$ is comparatively unaffected by the field E.

Light injected into the waveguide 5, as indicated by the arrow labeled "input" in FIG. 1, is resonant coupled to the second waveguide 7 through the coupling layer 9 and emerges from the second waveguide 7 as indicated by the arrow marked "cross", when $n_2$ is substantially equal to $n_1$. This is referred to as the cross propagation condition. When $n_2$ is not equal to $n_1$ there is a phase shift between light in the two waveguides, and a parallel propagation condition exists with the light passing through and emerging from the first waveguide as indicated by the arrow marked "parallel" in FIG. 1.

Figure 2:
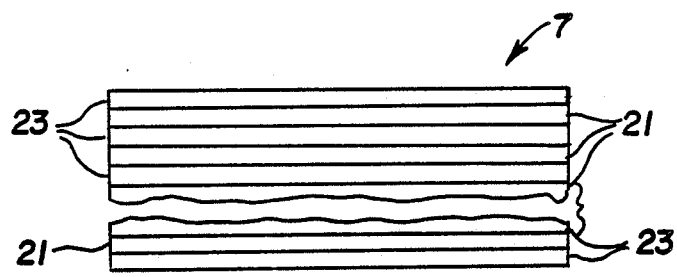
FIG. 2 is a greatly enlarged sectional view with part cutaway, illustrating a multiple-quantum-well structure which forms a part of the electro-optical coupler of FIG. 1.

The second waveguide 7 which is a multiple-quantum-well structure is illustrated in FIG. 2. This structure comprises a superlattice of alternating quantum-well layers 21 and barrier layers 23. These layers 21 and 23 are very thin; on the order of a few nanometers, and thus FIG. 2 is greatly enlarged.

Figure 3:
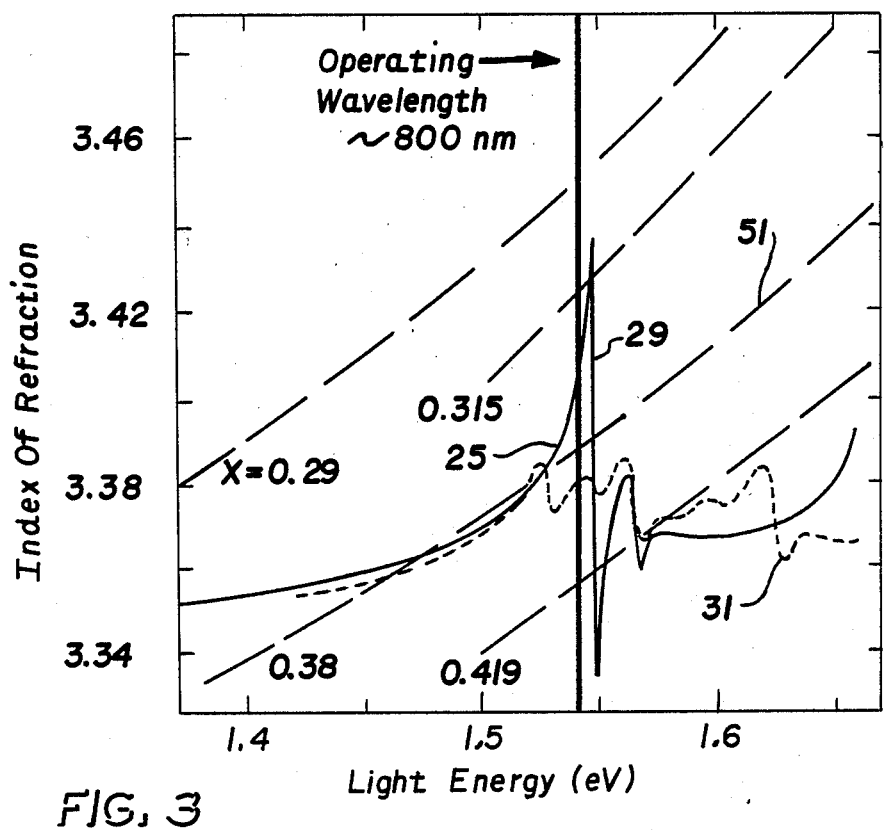
FIG. 3 is a plot of the index of refraction versus light energy for the multiple-quantum-well structure of FIG. 2 illustrating the effect on the index of an electric field.

As mentioned previously, such quantum-well materials exhibit an unusually strong dispersion of the index of refraction near the excitonic transition energy. This phenomenon is illustrated in FIG. 3 which is a plot of light energy versus the index of refraction. The solid line 25 represents the estimated index of refraction for an exemplary quantum well material in the absence of an electric field. The dotted line 27 represents the estimated index of refraction of this superlattice material for an applied field of 100 KV/cm. As can be seen from the plot, there is a range of light energies for this material just below the exciton transition energy, represented by the sharp drop in the trace 25 at 29, in which there is a substantial differential, $\Delta n$, in the index of fraction in the presence and absence of the electric field. For instance, for light energy of 1.54 eV, the exemplary material has an index of refraction of about 3.41 in the absence of an electric field, and about 3.38 in the presence of the 100 KV/cm field. Such a change in the index of refraction with an electric field, dn/dE, is a figure of merit which is used to determine the magnitude of the electric field required to effect switching: the larger dn/dE is, the smaller the voltage required for a given geometric design. Multiple-quantum-well structures exhibit a change in the index of refraction, dn/dE, which is up to one to two orders of magnitude higher than materials conventionally used in such devices. Hence, the voltage required for switching is reduced by this factor. For example, the required phase change can be accomplished in multiple-quantum-well structures with 1/100th of the voltage normally used with a GaAs switch.

Another advantage of the electro-optic coupler 1 of the invention is that the change in the index of refraction in the second waveguide 7 is the result of virtual optical transitions which take place in the quantum-wells at wavelengths slightly longer (lower energy light) than that at which excitonic absorption occurs. The response time of optical processes based on virtual transitions is extremely short (about 100 fs). Thus, the intrinsic switching time of the electro-optic coupler 1 is based only on the speed of the driving signal, i.e., by the RC time constant of the device and by the rise time of the switching voltage.

While a uniform electric field is applied to the first waveguide layer 5 and the coupling layer 9, as well as the multiple-quantum-well layer 7 in the electro-optic coupler 1, the lower voltage applied to effect the dn/dE required for switching does not appreciably change the indices of refraction $n_1$ or N. Thus, the dashed lines 31 in FIG. 3 representing exemplary indices of refraction for the first waveguide 5, do not shift appreciably in response to the electric field. It can be appreciated, therefore, that a material can be selected for the first waveguide which has an index of refraction of either about 3.41 or 3.38. In the first instance, light would be switched in the absence of the electric field, and in the latter case only in the presence of the electric field. It is preferable, that the light be switched in the presence of the electric field, since the multiple-quantum-well structure has a sizeable absorption coefficient, which is lower, however, in the presence of the electric field. It is also for this reason that it is preferable to inject the light into the first waveguide rather than the quantum well structure of the second waveguide so that there is better efficiency under parallel propagation conditions.

Another figure of merit in the performance of the electro-optical coupler 1 is related to the index of refraction, N, and the width, D, of the coupling material between the waveguides. Within limits, the narrower D and/or the smaller the difference between N and $n_1$ and $n_2$, the shorter is the length L of the waveguides required for cross-coupling. In turn, a shorter device length means a decreased device capacitance which, as previously discussed, increases the switching speed. It also reduces the energy required per switching cycle.

Figure 4:
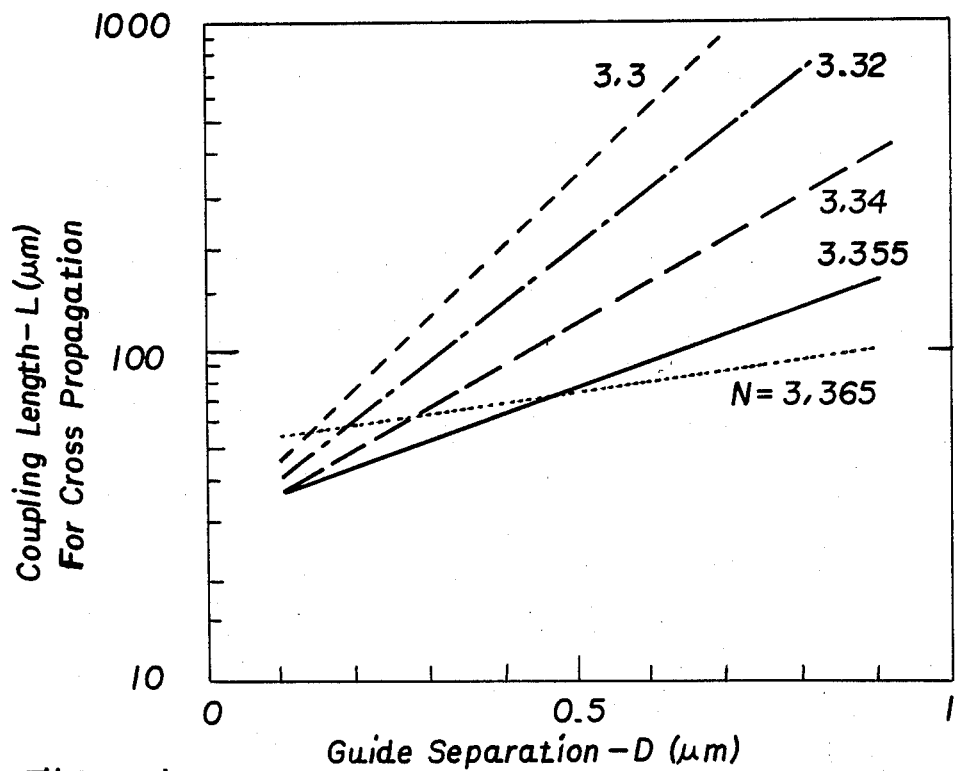
FIG. 4 is a plot of coupling length versus guide separation at selected values of the index of refraction of the coupling layer for maximal cross propagation in the coupler of FIG. 1.

FIG. 4 illustrates the relation of the coupling length L for maximal cross propagation to waveguide separation calculated for different indices of refraction of the coupling layer 9. The refractive index in both waveguides 5 and 7 is assumed to be n=3.38. It can be seen that for a width, D, of the coupling layer of 0.5 $\mu$m and an N of 3.355, that the length, L, required for resonant coupling is about 80 $\mu$m. This is well over an order of magnitude less than the length required in planar switches where fabrication techniques limit D to about 3 mm. The 0.5 $\mu$m thickness of the coupling layer 9 is easily achieved with techniques such as metal-organic chemical vapor deposition (MOCVD).

Figure 5:
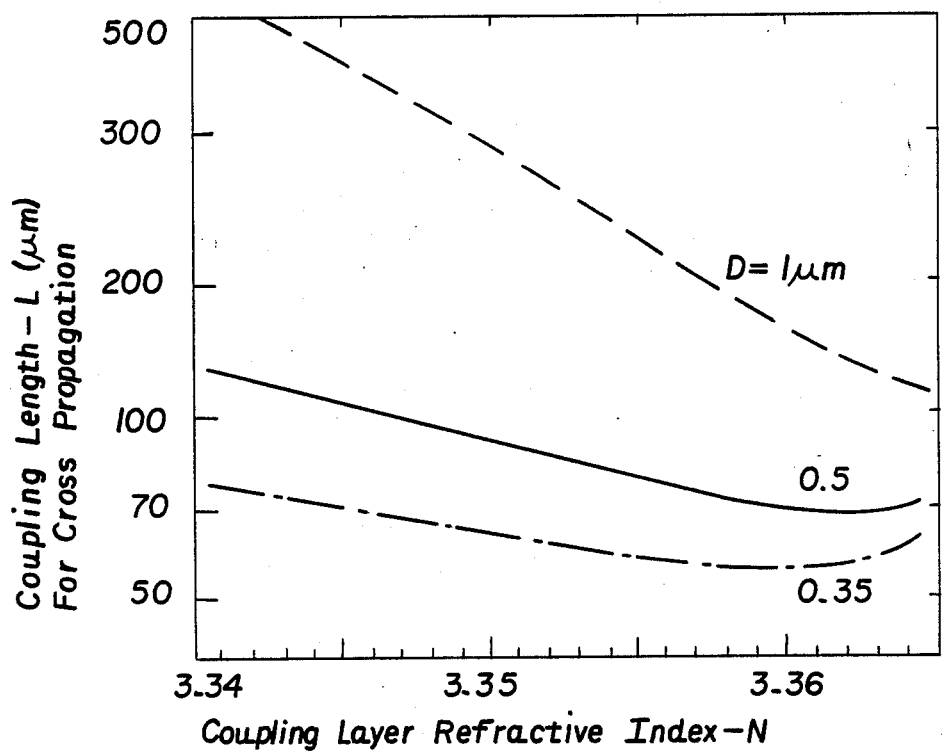
FIG. 5 is a plot of coupling length for maximal cross propagation as a function of coupling layer refractive index for different values of coupling layer thickness for the coupler of FIG. 1.

FIG. 5 illustrates the coupling length, L, for maximal cross propagation as a function of the refractive index, N, of the coupling layer 9 for different values of the coupling layer thickness D. The refractive index of the first and second waveguides 5 and 7 is n=3.38.

Figure 6:
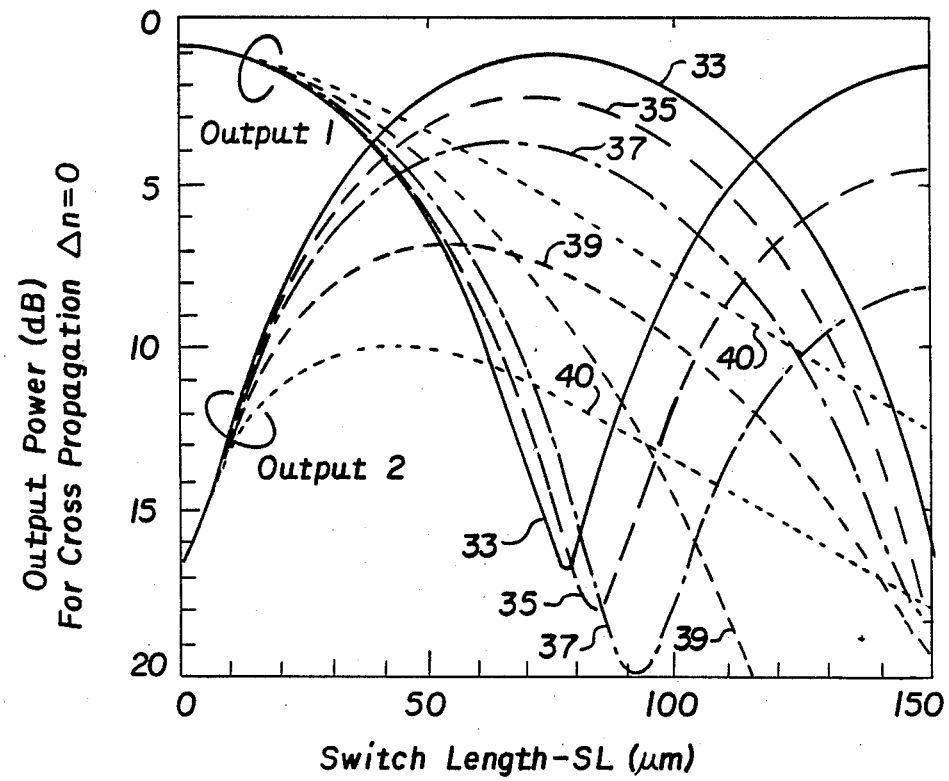
FIG. 6 is a plot of power coupled to the waveguide outputs as a function of switch length for cross propagation in the coupler of FIG. 1.

FIG. 6 illustrates the power coupled to the outputs of the waveguides, with light input to the first waveguide 5, as a function of switch length, SL, for cross propagation ($n_1 = n_2$). Switch length SL takes into account variations in the maximal coupling length attributable to differences in the absorption coefficients of the waveguides. Traces 33, 35, 37, 39 and 40 correspond to absorption coefficients ($\beta_2$) in the second waveguide, 7, of $10^{-3}, 10^{-2}, 2\times 10^{-2}, 5\times 10^{-2}$, and $10^{-1}$ $\mu m^{-1}$ respectively. The absorption coefficient ($\beta_1$) in the first waveguide 5 is $10^{-3}$ $\mu m^{-1}$. Optimal cross propagation is obtained for a switch length of 77 $\mu$m for a material with an absorption coefficient of $10^{-3}$ $\mu m^{-1}$.

Figure 7:
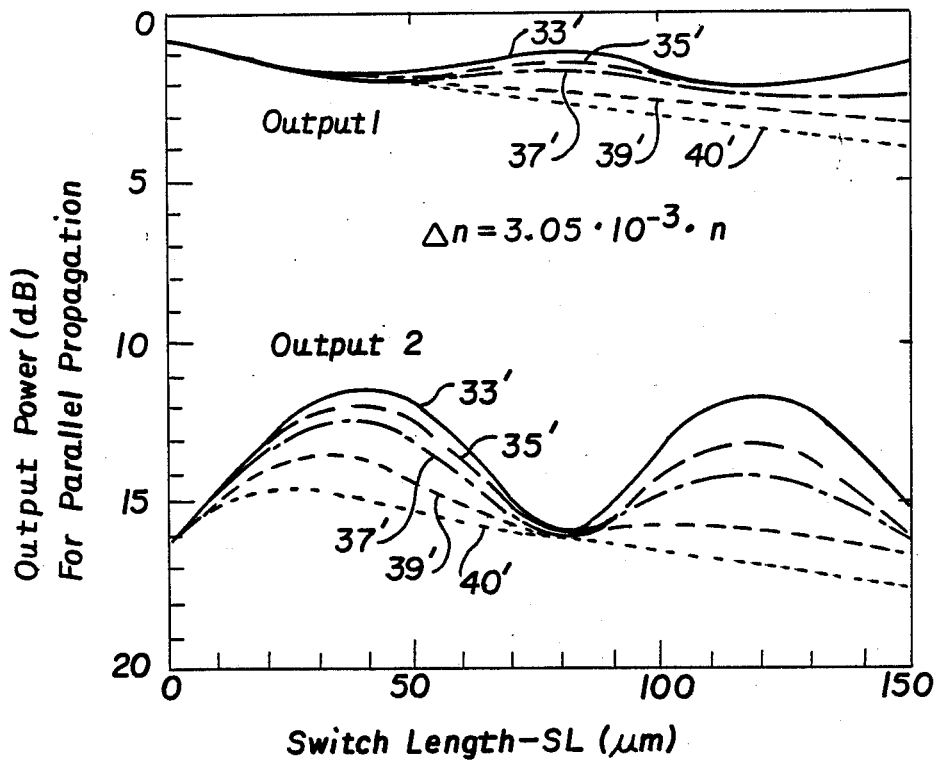
FIG. 7 is a plot of power coupled to the waveguide outputs as a function of switch length for parallel propagation in the coupler of FIG. 7.

FIG. 7 illustrates, for light input to the first waveguide 5, power coupled to the outputs of the waveguides as a function of the switch length, SL, for the parallel propagation condition. The value of $\Delta n/n = 3.05\times 10^{-3}$ is optimal for switch length SL=77

μm. The traces 33', 35', 37', 39' and 40' represent the values of the absorption coefficient $\beta_2$ of the second waveguide 7 corresponding to those identified for the traces 33, 35, 37 and 39 respectively in FIG. 6.

Figure 8:
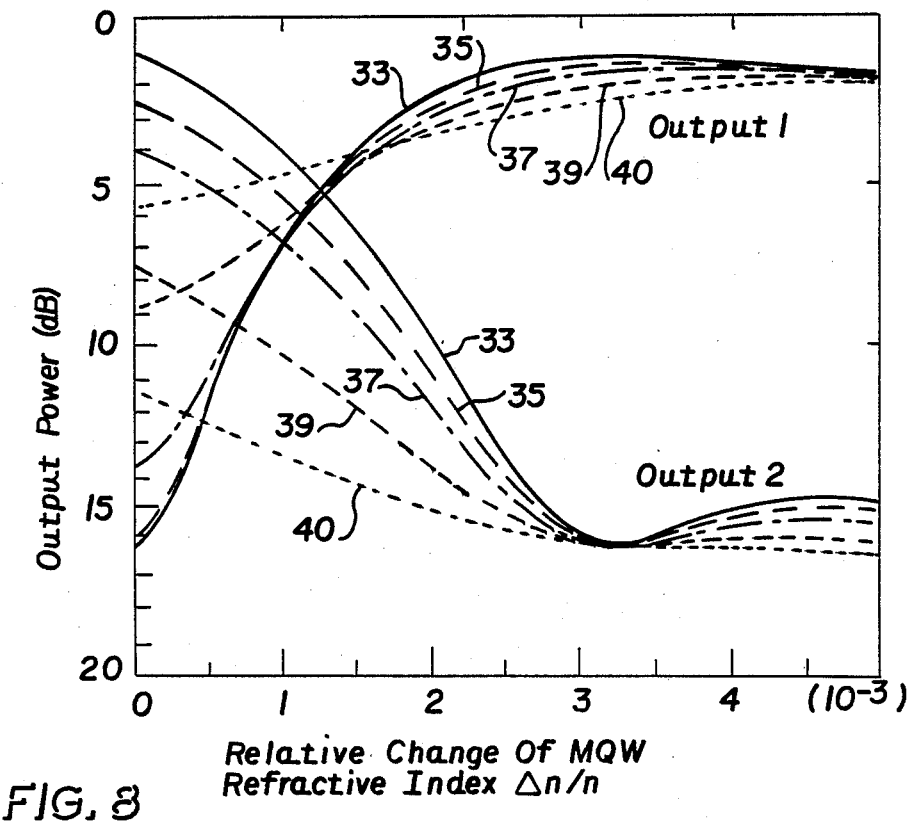
FIG. 8 is a plot of power coupled to the waveguide outputs as a function of the relative changes in the index of refraction of the multiple-quantum-well structure.

FIG. 8 illustrates output power for the two waveguides as a function of the relative changes in the index of refraction of the multiple-quantum-well structure of the second waveguide 7. The curves 33, 35, 37, 39 and 40 represent the values of the absorption coefficient $\beta_2$ of the second waveguide 7 covered in FIG. 6.

The optical coupler 1 shown in FIG. 1 is particularly suitable for use as a light switch. Light injected into the first waveguide 5 is cross propagated to the second waveguide 7, preferably in the presence of an electric field. In the absence of an electric field, the light is output from the first waveguide. Although not shown, the light output from the first and second waveguides of the switch is injected into connecting waveguides for transmission to other components. The waveguide connected to receive light from the second waveguide 7 of the switch would preferably not be made of multiple-quantum-well material but would be constructed from another suitable material with an absorption coefficient considerably lower than that of the multiple-quantum-well structure.

Figure 9:
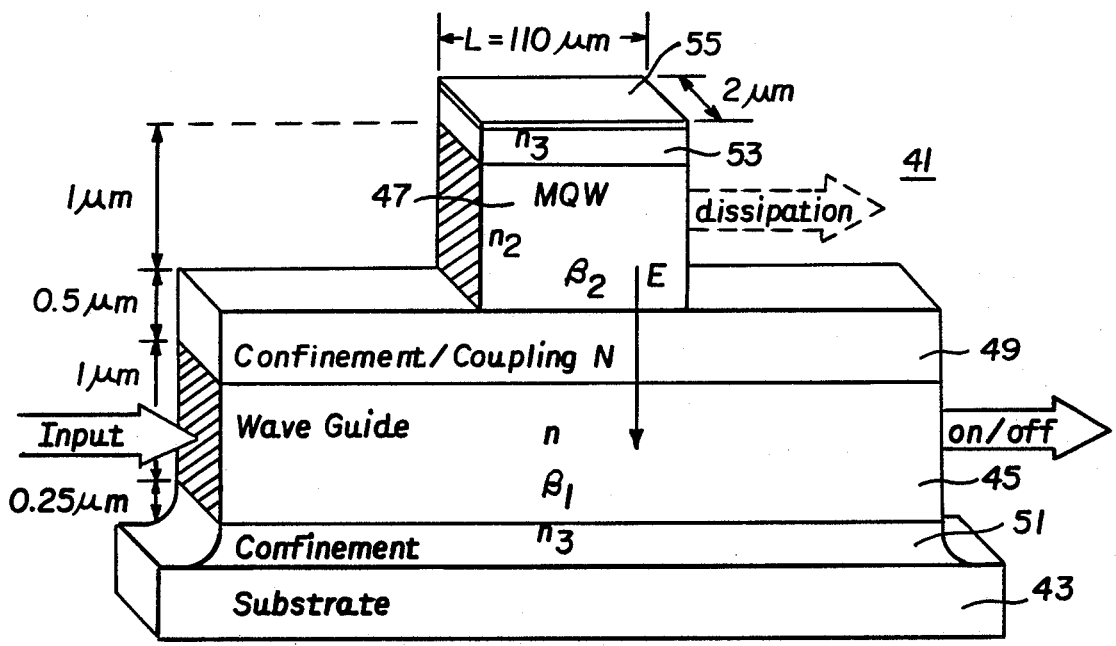
FIG. 9 is an isometric representation of another embodiment of an electro-optic coupler in accordance with invention adapted for use as a light attenuator or modulator.

The electro-optical coupler of the invention can also be used as a light attenuator or intensity modulator. An exemplary coupler 41 adapted for such use is shown in FIG. 9. This device comprises semiconductor layers grown on a substrate 43 and includes a first wave guide layer 45 and a second waveguide layer 47 on top of the first waveguide layer with a layer 49 between which serves as a coupling layer where the second waveguide layer is coextensive with the first waveguide layer, and serves as a confinement layer for the first waveguide beyond the boundaries of the second waveguide layer. Additional confinement layers 51 and 53 are provided between the first waveguide 45 and the substrate 43 and above the second waveguide layer 47 respectively. As in the case of the switch of FIG. 1, the second waveguide 47 is made of multiple-quantum-well structure having an index of refraction $n_2$ which varies substantially with an electric field E generated by a voltage applied across a metallization layer 55 on the confinement layer 53, and the substrate 43. Also as with the switch 1, the index of refraction $n_1$ of the first waveguide 45 is comparatively unaffected by the electric field and is selected to be substantially equal to one of the values of $n_2$, preferably the value of $n_2$ in the presence of the field E.

Light is applied to the first waveguide 45 as indicated by the arrow marked "input" in FIG. 8. In the parallel propagation condition, that is with $n_2$ not equal to $n_1$, the attenuator is "ON" and light is output from the first waveguide as indicated by the arrow marked "ON/OFF". Under cross-propagation conditions, light input to the first waveguide 45 is switched to the second waveguide 47 where it is dissipated through absorption in the multiple-quantum-well structure.

Figure 10:
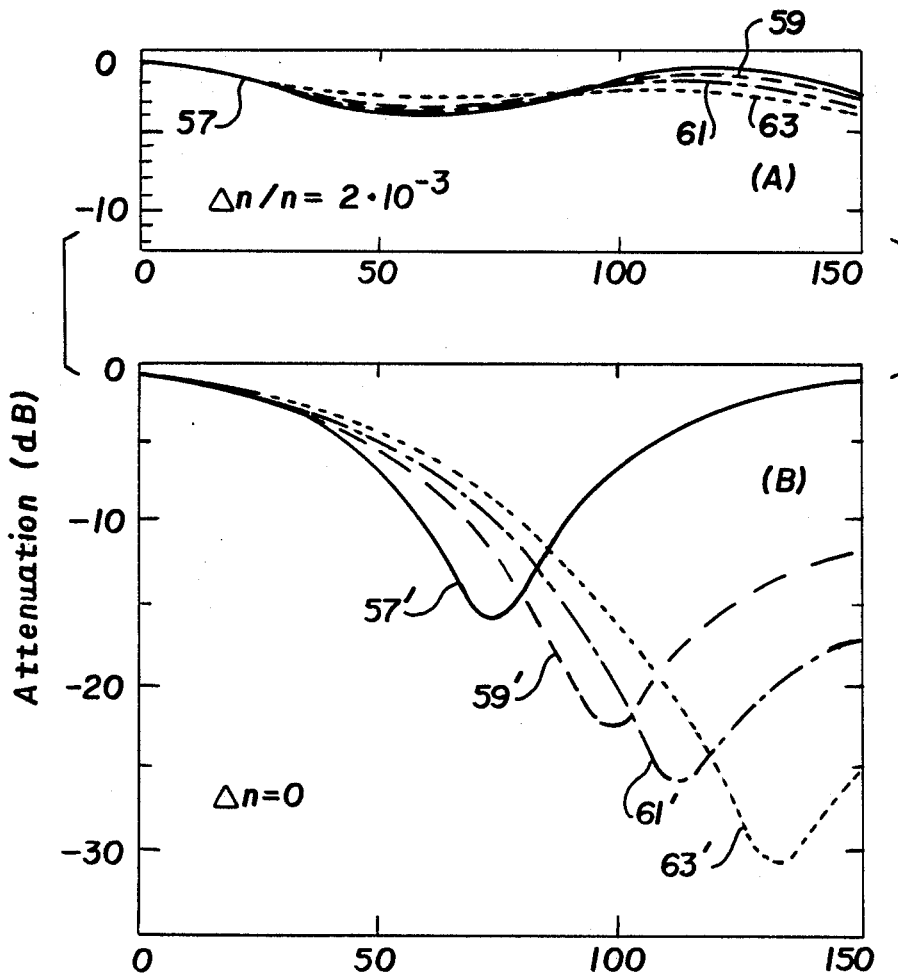
FIG. 10 is a plot of attenuation as a function of length in both the "ON" and "OFF" status for several absorption coefficients for the attenuator of FIG. 8.

FIG. 10 illustrates attenuation by the attenuator 41 in the "ON" state as a function of the length of the second waveguide for multiple-quantum-well absorption coefficients $\beta_2$ of $10^{-3}$, $3 \times 10^{-2}$, $4 \times 10^{-2}$ and $5 \times 10^{-2}$ $\mu m^{-1}$ as represented by traces 57, 59, 61 and 63 respectively. Attenuation in the "OFF" state is shown by the traces 57', 59', 61' and 63' for the corresponding values of $\beta_2$.

Since the function of the second waveguide layer 47 in the attenuator 41 is to dissipate light under cross propagation conditions, a higher absorption coefficient is desired in this application. This can be achieved using the same material as for the light switch 1 by utilizing light of a higher energy. The higher energy light moves the operating point of the device closer to the excitonic transition energy which results in the higher absorption coefficient. This, however, also results in an increase in the modulator length needed for maximum cross-propagation as indicated by FIG. 10.

The various layers of semiconductor material are grown on the substrate by using for instance MOCVD. With such techniques, the thickness and uniformity of the layers of semiconductor materials can be closely controlled. This makes it possible to fabricate devices with a coupling layer having submicron thickness. As previously mentioned, this allows the length of the device to be shorter so that the device occupies less real estate and reduces the capacitance so that the device can operate faster.

Techniques such as MOCVD also make it possible to build the multiple-quantum-well structures forming the second waveguides 7 and 47. The alternating barrier layers 23 and well layers 21 are on the order of only about 5 to 20 nm thick. Preferably, the wells are about 10 nm thick. The wider the wells are made, the lower the energy of the transitions and the closer the higher energy levels come to the operating point. On the other hand, the narrower the wells, the smaller the effect of the field and the smaller the range of wavelengths that can be used. For barrier thicknesses above about 5 nm, increasing thickness of the barrier results a decrease in the absolute value of the multiple quantum well structure.

The semiconductor materials having the suitable electro-optic properties for making the light switches and attenuators of the invention can be selected from group III–group V compounds and their solid solutions. In general, a GaAs system or an InP system can be used. We have found that ternary compounds such as in particular, AlGaAs are particularly useful since they can be fine tuned to the particular properties desired. We have found for instance ternary $Al_xGa_{1-x}As$ useful as the material for the first waveguide and, with slightly different Al to Ga ratios, for the barriers in the multiple-quantum-well structures in which the wells are made of GaAs. Other examples of group III–group V systems which could be employed for making the electro-optic couplers of the invention are GaSb, GaAlAsSb and InGaAsP. In addition, group II–group VI compound semiconductor materials such as a CdS system, a CdSe system, a ZnS system or a ZnSe system could be used.

By selecting semiconductor materials which have compatible crystal structures and lattice constants, the various layers can be easily grown on the substrate to the precise dimensions required, otherwise organic or other films would be needed between layers to grow the device.

It should also be noted that the semiconductor materials used are undoped and hence highly resistive since an electric field and not charge carriers are used as the mechanism to induce the change in the refraction index of the multiple-quantum-well structure. As mentioned, this produces a device which operates much faster and consumes less power than devices which employ charge carriers. The substrate may be an $n^+$ or $p^+$ semiconductor material, but this is to make the substrate a conductor so that a uniform field can be generated across the multiple-quantum-well structure. Alternatively, the substrate could be an insulator and a metalization layer could be applied to the substrate to serve as the conductor, or the substrate could be removed and the metalization applied directly to the lower confinement layer.

For single mode light, the total thickness of the coupler is between 1 and 3 $\mu$m with a width of about 1 to 5 $\mu$m.

EXAMPLE 1

An exemplary electro-optic coupler in accordance with the invention adapted for use as a switch for 1.540 eV light is depicted in FIG. 1. The first waveguide 5 is a 1 $\mu$m thick layer of ternary $Al_{0.35}Ga_{0.65}As$ which is calculated to have a refractive index of 3.38 at room temperature for 1.540 eV light and an absorption coefficient $\beta_1$ of $10^{-3}$ $\mu m^{-1}$. The second waveguide 7 is a 1 $\mu$m thick superlattice of 10 nm wide GaAs quantumwells 21 and 10 nm wide $Al_{0.3}Ga_{0.7}As$ barriers 23 which have been estimated to have an index of refraction of 3.38 in the presence of an applied field of 30 KV/m for 1.540 eV light and an index of refraction of about 3.41 in the absence of the field. The absorption coefficient $\beta_2$ is about $10^{-3}$ $\mu m^{-1}$ in the presence of the 30 KV/m field and about $3 \times 10^{-3}$ $\mu m^{-1}$ in its absence.

The waveguides 5 and 7 are grown using MOCVD techniques on an n+ GaAs substrate with a 0.25 $\mu$m confinement layer 11 made of $Al_{0.8}Ga_{0.2}As$ having an index of refraction $n_3$ of 3.136 between the substrate 3 and the second waveguide layer 7. A second confinement layer 13 with similar parameters covers the first waveguide layer. The coupling layer 9 is a 0.5 $\mu$m thick layer of $Al_{0.43}Ga_{0.57}As$ having an index of refraction of 3.355 with 1.540 eV light. The switch 1, which is designed for single mode light transmission, has a length of 77 $\mu$m and a width of 2 $\mu$m. FIGS. 6 and 7 show that with 1.540 eV light injected into the first waveguide, the output power of the first waveguide of this exemplary device is $-17$ dB below the input power for the cross-propagation condition and $-1$ dB for the parallel propagation condition. The corresponding power output for the second waveguide is $-1$ dB below the input power for the cross propagation condition and $-17$ dB for the parallel propagation condition.

EXAMPLE 2

FIG. 9 illustrates an example of an electro-optical coupler 41 of the invention adapted for use as an attenuator. The materials used for the first waveguide layer 5, the superlattice second waveguide layer 7, the coupling layer 9 and the confinement layers 11 and 13 are the same as in the case of the device of example 1. In this device, however, the second waveguide 7 is above the first waveguide layer 5 and the coupling layer 9 so that the first waveguide layer can extend beyond the required dimensions of the device to serve also as a connecting waveguide, and the second waveguide 7 can be etched to the desired dimensions. The length of this device is 110 $\mu$m. The difference in length is attributed to the function of this device to dissipate power cross propagated from the first waveguide. Using the higher absorption coefficient $_2 = 10^{-1}$ $\mu m^{-1}$, FIG. 10 shows that the length L for maximal cross propagation in 110 $\mu$m. This increase in the absorption coefficient $\beta_2$ can be obtained employing the same materials as in the switch of Example 1 by using light of the slightly higher energy level of about 1.55 eV. Of course, alternatively, the material composition can be adjusted to provide the desired operation at the 1.540 eV energy level.

Performance parameters of the devices 1 of Example 1 and device 41 of Example 2 are set forth in the following table.

TABLE

|  |  | Device 1 | Device 41 |
|---|---|---|---|
| Length | [$\mu$m] | 77 | 110 |
| Switching Voltage | [V] | 6 | 4 |
| Capacitance | [fF] | 5 | 7 |
| Switching time (for R = 50 K Ohms) | [ns] | 0.25 | 0.36 |
| Energy/Cycle | [pJ] | 0.08 | 0.055 |
| Power | [$\mu$W] |  |  |
| for 16 MHz |  | 1 | 1 |
| for 4 GHz |  | 400 | 400 |
| Opt Transfer Efficiency (max-min) | [%] | 75–3.7 | 85–0.8 |
| Power Loss | [dB] | 1.3* | 0.7* |
| Power Isolation | [dB] | 13 | 20 |

*without absorption.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electro-optic coupler comprising a plurality of layers of semiconductor materials including:
   a first waveguide layer having an index of refraction $n_1$;
   a second waveguide layer comprising a multiple-quantum-well structure and having an index of refraction $n_2$;
   a coupling layer between said first and second waveguide layers having an index of refraction N;
   confinement layers outside said first and second waveguide layers and having an index of refraction $n_3$; and
   means for applying an electric field across said layers of semiconductor materials with $n_1$, N and $n_3$ relative to $n_2$ being unaffected by said electric field, while $n_2$ varies substantially with the electric field from a first value in the absence of an electric field to a second value in the presence of said electric field, one of said first and second values of $n_2$ being essentially equal to $n_1$, and $n_3$ being substantially less than $n_1$ and both the first and second values of $n_2$.

2. The electro-optic coupler of claim 1 wherein said second waveguide layer extends a distance L in the direction of propagation of light injected into one of said first and second waveguide layers, wherein said first waveguide layer extends at least the distance L, and wherein L is selected to effect maximum coupling of light between said waveguide layers when $n_1$ and $n_2$ are substantially equal.

3. The electro-optic coupler of claim 2 wherein said layers of semiconductor materials are grown on a substrate doped to be a conductor, and wherein said means for applying said electric field includes an electrically conductive contact layer substantially coextensive with said second waveguide layer and spaced from the substrate by at least said second waveguide layer, and means applying said electric field between said electrically conductive contact layer and said substrate.

4. The electro-optic coupler of claim 2 wherein said layers of semiconductor materials are grown on an insulating substrate, and wherein said means for applying an electric field includes a first electrically conductive contact layer substantially coextensive with said second waveguide layer and spaced from the substrate by at least said second waveguide layer, a second electrically conductive contact layer applied to said substrate, and means applying said electric field between said first and second electrically conductive contact layers.

5. The electro-optic coupler of claim 2 wherein said means applying an electric field includes a first electrically conductive contact layer applied to one of said confinement layers, a second electrically conductive contact layer applied to the other confinement layer, and means applying said electric field between said first and second electrically conductive contact layers.

6. The electro-optic coupler of claim 2 wherein said one value of $n_2$ is said second value such that light injected into said one waveguide layer is switched to the other waveguide layer when said electric field is applied to said layers of semiconductor materials.

7. The electro-optic coupler of claim 2 wherein said second waveguide layer is grown over said first waveguide layer with a coupling layer in between, and wherein said second waveguide layer is etched to said length L.

8. The electro-optical coupler of claim 1 wherein said means for applying said electric field across said layers of semiconductor materials comprises means to apply a uniform electric field over coextensive areas of said wave guide layers.

9. The electro-optic coupler of claim 1 wherein said second waveguide layer comprises a plurality of quantum-well layers bounded by barrier layers with said quantum-well and barrier layers each having a thickness of about 5 to 20 nm.

10. The electro-optic coupler of claim 9 wherein said quantum well layers and barrier layers each have a thickness of about 10 nm.

11. The electro-optic coupler of claim 9 wherein said coupling layer is not thicker than about 1 $\mu$m.

12. The electro-optic coupler of claim 11 wherein said coupling layer is not thicker than about 0.5 $\mu$m.

13. The electro-optic coupler of claim 2 wherein said waveguide layers are about 1 $\mu$m thick.

14. The electro-optic coupler of claim 13 wherein said coupling layer is not more than about 0.5 $\mu$m thick.

15. The electro-optic coupler of claim 14 wherein said length L is less than about 120 $\mu$m.

16. The electric-optic coupler of claim 15 wherein said second waveguide layer comprises a plurality of quantum-well layers bound by barrier layers with said quantum-well and barrier layers each having a thickness of about 5 to 20 nm.

17. The electro-optic coupler of claim 15 wherein said quantum well layers and barrier layers each have a thickness of about 10 nm.

18. The electro-optic coupler of claim 1 wherein said semiconductor materials are selected from a group consisting of group III–group V compounds.

19. The electro-optic coupler of claim 18 wherein said first waveguide layers, said coupling layer and said confinement layers are made of AlGaAs compounds and wherein the multiple-quantum-well material of said second waveguide layer comprises quantum-well layers of GaAs bounded by barrier layers of an AlGaAs compound.

20. The electro-optic coupler of claim 1 wherein said semiconductor materials are selected from a group consisting of group II–group VI compounds.

* * * * *

UNITED STATES PATENT AND TRADEMARK OFFICE
CERTIFICATE OF CORRECTION

PATENT NO. : 4,923,264

DATED : May 8, 1990

INVENTOR(S) : DIETRICH W. LANGER and MAREK CHMIELOWSKI

It is certified that error appears in the above-identified patent and that said Letters Patent is hereby corrected as shown below:

In the Abstract, line 2, "an" should be --as--.

In the Abstract, after the last sentence, the following should be inserted:
--When used as an attenuator, light injected into the bulk semiconductor material waveguide passes through that waveguide in an "on" state in which the indices of refraction in the waveguides are not equal. In the "OFF" state, when the indices of refraction of the waveguides are equal, the light is switched to the multiple-quantum-well structure waveguide where it is dissipated. The coupler is faster, occupies less real estate and consumes less power than conventional electro-optic couplers.--

Col. 1, line 19, "material" should be --materials--.

Col. 2, line 43, "the" (third occurrence) should be deleted.

Claim 1, col. 10, line 43, "outside" should be --adjacent--.

Signed and Sealed this

Twelfth Day of May, 1992

Attest:

DOUGLAS B. COMER

*Attesting Officer*     *Acting Commissioner of Patents and Trademarks*